United States Patent
Powers

(10) Patent No.: US 11,604,678 B2
(45) Date of Patent: Mar. 14, 2023

(54) SYSTEM FOR RESOURCE USAGE MODIFICATION BASED ON RESOURCE SERVICES

(71) Applicant: BANK OF AMERICA CORPORATION, Charlotte, NC (US)

(72) Inventor: Robert W. Powers, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 266 days.

(21) Appl. No.: 16/832,854

(22) Filed: Mar. 27, 2020

(65) Prior Publication Data

US 2021/0303351 A1    Sep. 30, 2021

(51) Int. Cl.
*G06Q 10/06*    (2023.01)
*G06F 9/50*    (2006.01)
(Continued)

(52) U.S. Cl.
CPC ............ *G06F 9/5011* (2013.01); *G06F 9/451* (2018.02); *G06F 9/4806* (2013.01);
(Continued)

(58) Field of Classification Search
CPC ................... G06Q 10/06315; G06Q 10/06375
(Continued)

(56) References Cited

U.S. PATENT DOCUMENTS 5,710,889 A    1/1998    Clark et al.
6,349,290 B1    2/2002    Horowitz et al.
(Continued)

FOREIGN PATENT DOCUMENTS

CA    3019774 A1 *    4/2019    ........... G07F 19/202
CN    106330565 A *    1/2017
(Continued)

OTHER PUBLICATIONS

"Approximating Methodology: Managing Cash in Automated Teller Machines using Fuzzy ARTMAP Network," by Nidhi Arora and Jatinder Kumar R. Saini. International Journal of Enhanced Research in Science Technology & Engineering. vol. 3, Issue 2. Feb. 2014. pp. 318-326 (Year: 2014).*

*Primary Examiner* — Sara C Hamilton
(74) *Attorney, Agent, or Firm* — Moore & Van Allen PLLC; Nicholas C. Russell

(57) ABSTRACT

Systems, computer program products, and methods are described herein for intelligent resource usage modification based on resource services. The present invention is configured to receive resource transfer information from one or more resource distribution machines, receive machine-specific information from one or more resource distribution machines, analyze resource transfer information and machine-specific information in conjunction to determine predicted servicing requirements for the one or more resource distribution machines, designate the one or more resource distribution machines as preferred or non-preferred resource distribution machines based on the predicted servicing requirements for the one or more resource distribution machines, and transmit instruction to the one or more resource distribution machines, wherein the instructions alter the user interface of the one or more resource distribution machines with the aim of steering usage of those one or more resource distribution machines in a specifically preferred manner.

16 Claims, 4 Drawing Sheets

(51) Int. Cl.
*G06F 9/451* (2018.01)
*G06F 9/48* (2006.01)
*G06Q 10/0637* (2023.01)
*G06Q 10/0631* (2023.01)

(52) U.S. Cl.
CPC ..... *G06F 9/5038* (2013.01); *G06Q 10/06315* (2013.01); *G06Q 10/06375* (2013.01); *G06F 2209/508* (2013.01); *G06F 2209/5019* (2013.01)

(58) Field of Classification Search
USPC .......................................................... 705/39
See application file for complete search history.

(56) References Cited

U.S. PATENT DOCUMENTS

| | | | |
|---|---|---|---|
| 6,520,410 B2 | 2/2003 | Putman et al. | |
| 7,494,046 B2 | 2/2009 | Graef et al. | |
| 7,757,940 B2 | 7/2010 | Sawa | |
| 7,870,498 B2 | 1/2011 | Drummond et al. | |
| 8,123,123 B1 | 2/2012 | Doland et al. | |
| 8,240,450 B2 | 8/2012 | Brexel et al. | |
| 8,290,869 B2 | 10/2012 | Miyazaki et al. | |
| 8,302,856 B1 | 11/2012 | Grimm et al. | |
| 8,459,540 B2 | 6/2013 | Brindley et al. | |
| 8,539,032 B2 | 9/2013 | Pugaczewski et al. | |
| 8,746,552 B1 | 6/2014 | Yokomoto et al. | |
| 9,454,863 B2 | 9/2016 | Chugo | |
| 10,395,199 B1 * | 8/2019 | Gibson | G06Q 20/18 |
| 10,460,379 B1 | 10/2019 | Diggdon et al. | |
| 10,878,668 B1 * | 12/2020 | van Beek Faletti | H04W 4/025 |
| 2001/0011242 A1 | 8/2001 | Allex et al. | |
| 2002/0052845 A1 * | 5/2002 | Nielsen | G07F 19/207 705/43 |
| 2002/0082994 A1 | 6/2002 | Herziger | |
| 2002/0107800 A1 | 8/2002 | Kadowaki et al. | |
| 2002/0174006 A1 | 11/2002 | Rugge et al. | |
| 2004/0039701 A1 | 2/2004 | Nakamura et al. | |
| 2016/0148179 A1 * | 5/2016 | James | G07F 19/209 705/43 |
| 2019/0147421 A1 * | 5/2019 | Phillips | G06Q 20/1085 705/43 |
| 2019/0147707 A1 * | 5/2019 | Phillips | G07F 19/206 235/379 |
| 2019/0318331 A1 * | 10/2019 | Wurmfeld | G06N 20/00 |
| 2020/0410824 A1 * | 12/2020 | Bhuvad | G06V 40/172 |
| 2021/0045043 A1 * | 2/2021 | Shannon | H04W 48/04 |
| 2021/0081913 A1 * | 3/2021 | Benkreira | G06N 5/02 |
| 2021/0150497 A1 * | 5/2021 | Phillips | G07F 19/206 |

FOREIGN PATENT DOCUMENTS

| | | | | |
|---|---|---|---|---|
| CN | 111080929 A | * | 4/2020 | ............ G07F 19/00 |
| WO | WO-2021045638 A1 | * | 3/2021 | ............ G06F 17/00 |

* cited by examiner

SYSTEM FOR RESOURCE USAGE MODIFICATION BASED ON RESOURCE SERVICES

FIELD OF THE INVENTION

The present invention embraces a system for intelligent resource usage modification based on resource services.

BACKGROUND

Distribution of physical resources is a process that is often planned for dependent on usage level of resource distribution devices. Therefore, there is a need for an intelligent system for not only predicting usage levels, but modifying usage levels with the goal of improving and simplifying logistics involved.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for resource usage modification based on resource services is presented. The system comprising: at least one non-transitory storage device; and at least one processing device coupled to the at least one non-transitory storage device, wherein the at least one processing device is configured to: receive resource transfer information from one or more resource distribution machines; receive machine-specific information from one or more resource distribution machines; analyze resource transfer information and machine-specific information in conjunction to determine predicted servicing requirements for the one or more resource distribution machines; designate the one or more resource distribution machines as preferred or non-preferred resource distribution machines based on the predicted servicing requirements for the one or more resource distribution machines; and transmit instruction to the one or more resource distribution machines, wherein the instructions alter the user interface of the one or more resource distribution machines.

In some embodiments, the resource transfer information comprises data related to withdrawal of resources from the one or more resource distribution machines, and metadata comprising geographic location, time of day, denominations of resources, amount of resources, or frequency of resource transfers.

In some embodiments, machine-specific information comprises real-time information related to amount of resources contained in each of the one or more resource distribution machines, denominations of resources contained in each of the one or more resource distribution machines, required expenditure to service each of the one or more resource distribution machines, frequency of use of each of the one or more resource distribution machines, or technological capabilities of each of the one or more resource distribution machines.

In some embodiments, determining predicted servicing requirements for the one or more resource distribution machines further comprises calculating an approximate timeframe during which the one or more resource distribution machines will require additional resources based on amount of resources currently contained in the one or more resource distribution machines and frequency of resource transfers occurring at the one or more resource distribution machines.

In some embodiments, designating the one or more resource distribution machines as preferred or non-preferred resource distribution machines further comprises a comparison of a relative required expenditure of servicing the one or more resource distribution machines and determining that a required expenditure is relatively higher or lower than other resource distribution machines within a designated geographical area.

In some embodiments, altering the user interface of the one or more resource distribution machines further comprises displaying a suggestion for a recommended resource transfer on the preferred resource distribution machines.

In some embodiments, altering the user interface of the one or more resource distribution machines further comprises limiting the functionality of non-preferred resource distribution machines, wherein limiting the functionality of the non-preferred resource distribution machines includes limiting an amount or denomination of resources available for resource transfer at the non-preferred resource distribution machines.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
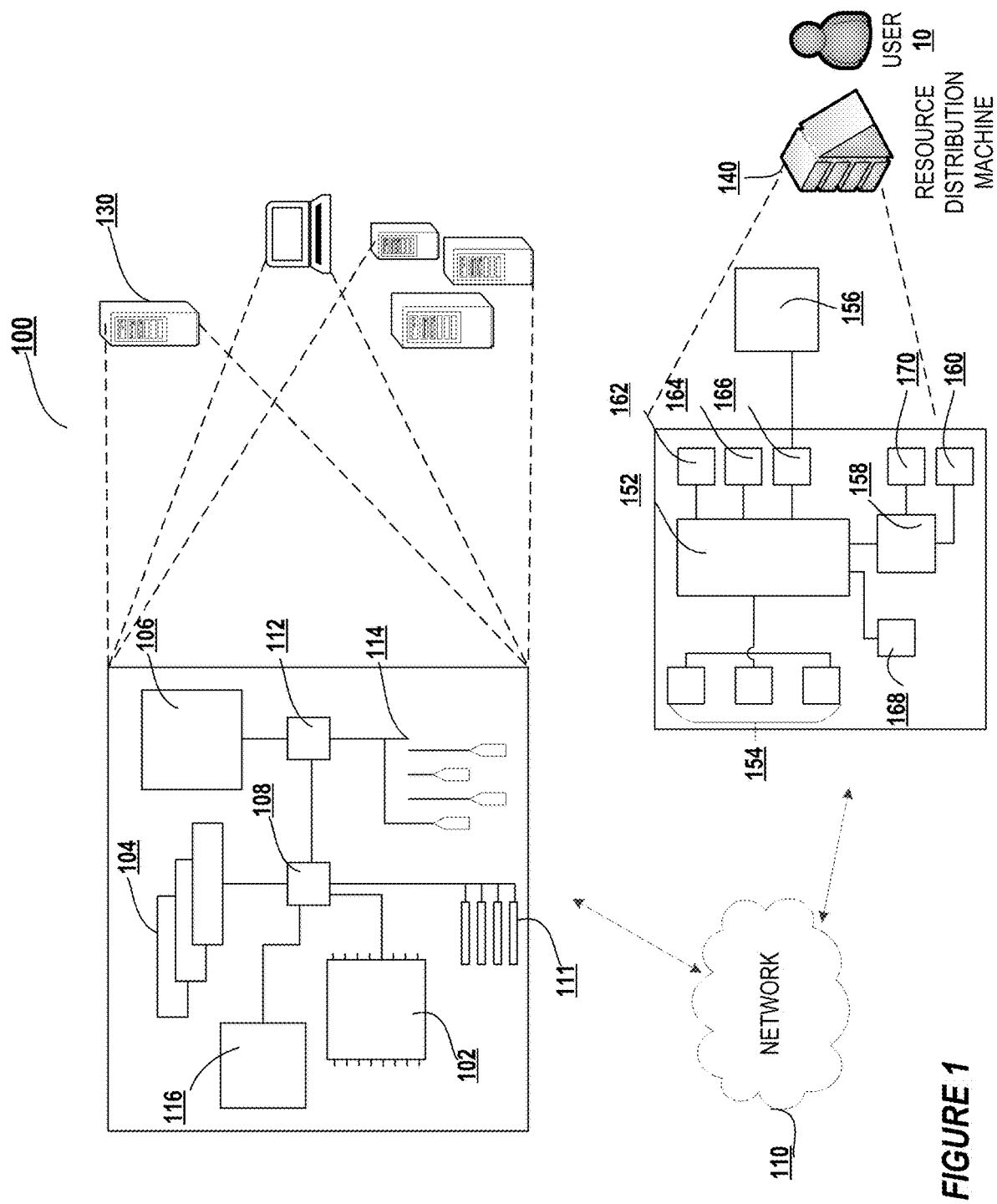
Figure 2:
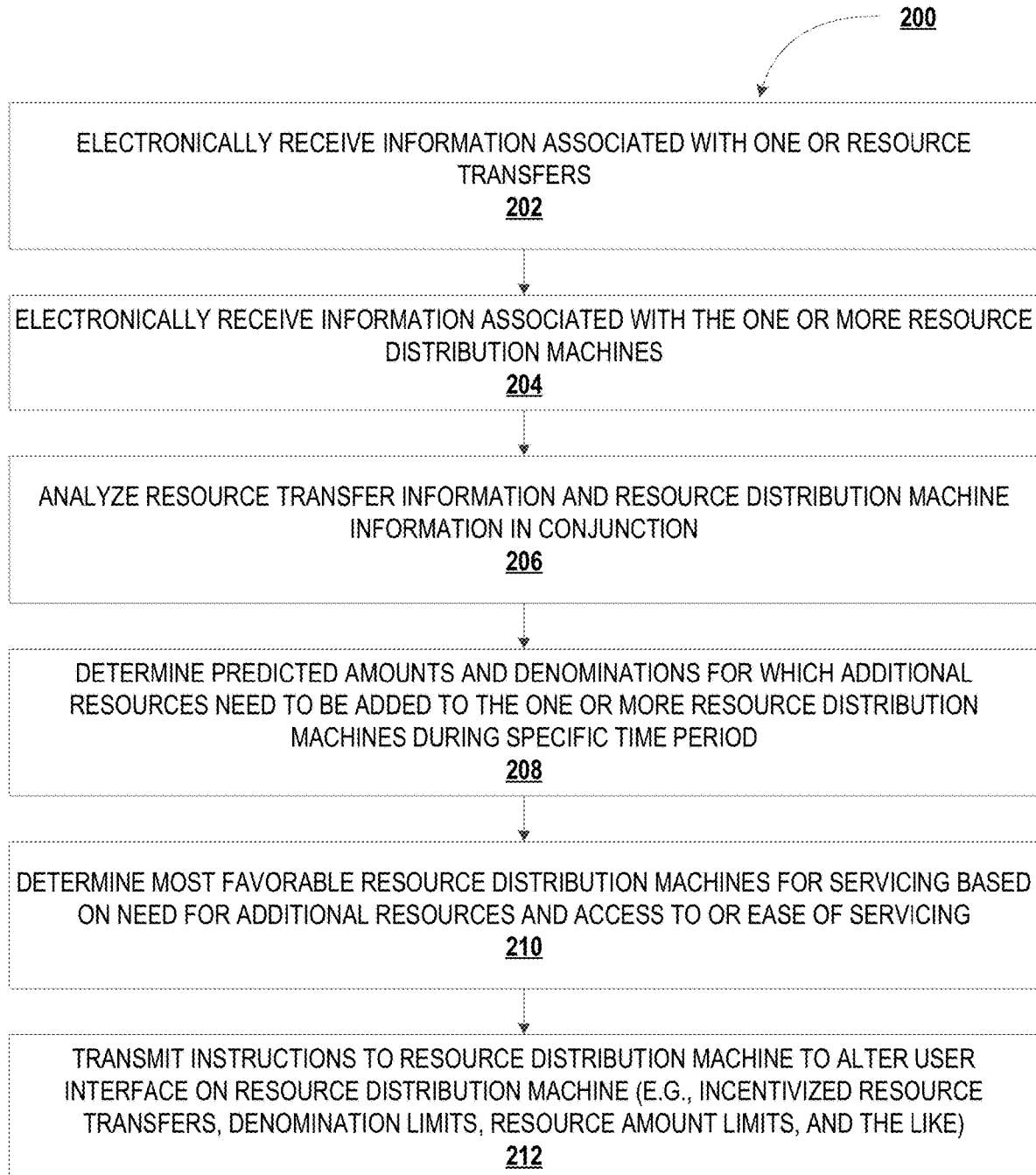
Figure 3:
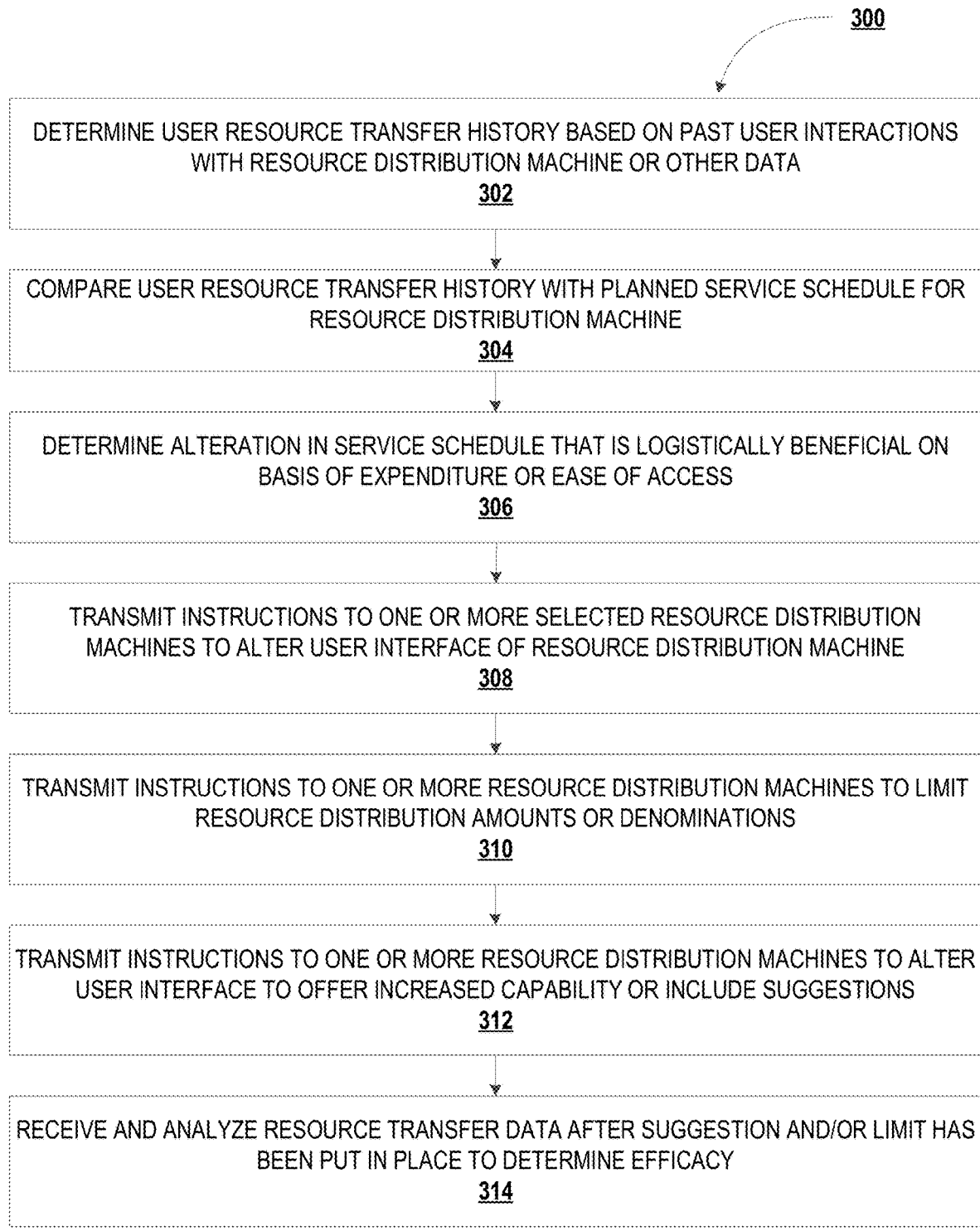
Figure 4:
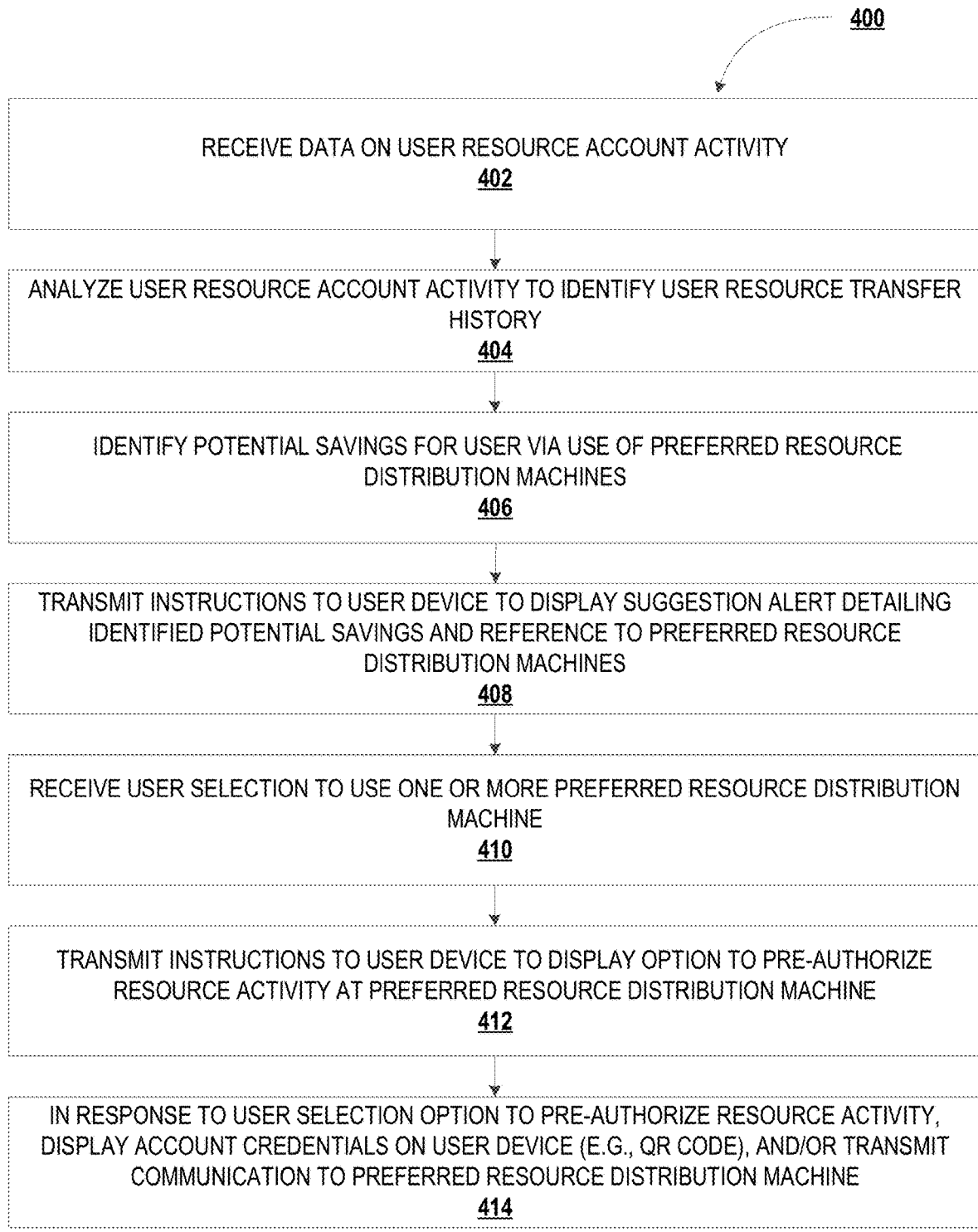

Having thus described embodiments of the invention in general terms, reference will now be made the accompanying drawings, wherein:

FIG. 1 illustrates technical components of a system for intelligent factor based resource distribution loading, in accordance an embodiment of the present invention;

FIG. 2 illustrates a process flow 200 for intelligent resource transfer analysis and resource distribution machine configuration, in accordance an embodiment of the present invention;

FIG. 3 illustrates a process flow 300 for intelligent resource usage modification via resource distribution machine configuration, in accordance an embodiment of the present invention; and FIG. 4 illustrates a process flow 400 for intelligent resource transfer suggestions via user device, in accordance an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer" or "resource distribution" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for resource usage modification based on resource services 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and one or more resource distribution machines, represented by resource distribution machine 140 in FIG. 1. Also shown in FIG. 1 is a user of the resource distribution machine 140. The resource distribution machine 140 may be a mobile device or other non-mobile computing device. In some embodiments, the resource distribution machine 140 may be an automated teller machine (ATM). The user 10 may be a person who uses the resource distribution machine 140 to execute resource transfers using one or more applications stored on the resource distribution machine 140 and/or a user computing device (not shown) associated with the user 10. In some embodiments, the user 10 may interact with the resource distribution machine 140 and/or the system 130 to execute a resource transfer. In example embodiments where the resource distribution machine 140 is an ATM, the user 10 may interact with the ATM to execute transactions including, but not limited to, deposit or withdraw funds using an ATM, facilitate line-of-credit payments, transfers, report account information, and/or the like. The one or more applications may be configured to communicate with the system 130, execute a resource transfer, input information onto a user interface presented on the resource distribution machine 140, or the like. The applications stored on the resource distribution machine 140 and the system 130 may incorporate one or more parts of any process flow described herein.

As shown in FIG. 1, the system 130, and the resource distribution machine 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the resource distribution machine 140 may be used to implement the processes described herein, including the device-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The resource distribution machine 140 is intended to represent various forms of computing devices capable of resource distribution such as an ATM device. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices such as a resource computing terminal (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a resource distribution machine 140, in accordance with an embodiment of the invention. The resource distribution machine 140 includes a processor 152, memory 154, an input/output device such as a display 156, a communication interface 158, and a transceiver 160, among other components. The resource distribution machine 140 may also be provided with a storage device, such as a microdrive, cassette reader, or other device, to provide additional storage. Each of the components 152, 154, 158, and 160, are interconnected using various buses, and several of the components may be mounted on a common motherboard or in other manners as appropriate.

The processor 152 is configured to execute instructions within the resource distribution machine 140, including instructions stored in the memory 154. The processor may be implemented as a chipset of chips that include separate and multiple analog and digital processors. The processor may be configured to provide, for example, for coordination of the other components of the resource distribution machine 140, such as control of user interfaces, applications run by resource distribution machine 140, and wireless communication by resource distribution machine 140.

The processor 152 may be configured to communicate with the user 10 through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to the user 10. The control interface 164 may receive commands from a user and convert them for submission to the processor 152. In addition, an external interface 168 may be provided in communication with processor 152, so as to enable near area communication of resource distribution machine 140 with other devices. External interface 168 may provide, for example, for wired communication in some implementations, or for wireless communication in other implementations, and multiple interfaces may also be used.

The memory 154 stores information within the resource distribution machine 140. The memory 154 can be implemented as one or more of a computer-readable medium or media, a volatile memory unit or units, or a non-volatile memory unit or units. Expansion memory may also be provided and connected to resource distribution machine 140 through an expansion interface (not shown), which may include, for example, a SIMM (Single In Line Memory Module) card interface. Such expansion memory may provide extra storage space for resource distribution machine 140, or may also store applications or other information therein. In some embodiments, expansion memory may include instructions to carry out or supplement the processes described above, and may include secure information also. For example, expansion memory may be provided as a security module for resource distribution machine 140, and may be programmed with instructions that permit secure use of resource distribution machine 140. In addition, secure applications may be provided via the SIMM cards, along with additional information, such as placing identifying information on the SIMM card in a non-hackable manner. In some embodiments, the user 10 may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user 10 may use the resource distribution machine 140 to transmit and/or receive information or commands to and from the system 130. In this regard, the system 130 may be configured to establish a communication link with the resource distribution machine 140, whereby the communication link establishes a data channel (wired or wireless) to facilitate the transfer of data between the resource distribution machine 140 and the system 130. In doing so, the system 130 may be configured to access one or more aspects of the resource distribution machine 140, such as, a GPS device, an image capturing component (e.g., camera), a microphone, a speaker, or the like.

The resource distribution machine 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to resource distribution machine 140, which may be used as appropriate by applications running thereon, and in some embodiments, one or more applications operating on the system 130.

The resource distribution machine 140 may also communicate audibly using audio codec 162, which may receive spoken information from the user 10 and convert it to usable digital information. Audio codec 162 may likewise generate audible sound for the user 10, such as through a speaker, e.g., in a handset of resource distribution machine 140. Such sound may include sound from voice telephone calls, may include recorded sound (e.g., voice messages, music files, etc.) and may also include sound generated by one or more applications operating on the resource distribution machine 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, cassette, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with the user 10, the systems and techniques described here can be implemented on a computer having a display device (e.g., a CRT (cathode ray tube) or LCD (liquid crystal display) monitor) for displaying information to the user 10 and a keyboard and a pointing device (e.g., a mouse or a trackball) by which the user 10 can provide input to the computer. Other kinds of devices can be used to provide for interaction with the user 10 as well; for example, feedback provided to the user 10 can be any form of sensory feedback (e.g., visual feedback, auditory feedback, or tactile feedback); and input from the user 10 can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which the user 10 can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The present invention may implement user programmed or machine-learning-based algorithms on information associated with one or more resource transfers to identify an amount or denomination of funds which would be most efficient to be loaded into each resource distribution machine 140 located within a geographic region or managed by the entity that manages the resource distribution machine 140. Each resource distribution machine may store data related to resource transfers, such as one or more users withdrawing resources from the resource distribution machine, one or more users depositing resources at a resource distribution machine, one or more users viewing a resource balance at a resource distribution machine, and the like. Resource transfer data may include metadata, such as location, time of day, denominations of resources chosen or dispensed, amount of resources requested, frequency of resource transfers by the same user, family of users, groups of users, and other user characteristics, including account characteristics and spend history linked to the user's resource account from which they withdraw resources using the resource distribution machine 140. As discussed more in FIG. 2, this resource transfer information and other user information can be used to determine methods of steering users to a particular resource distribution machine 140 location, as well as track and plan for resource usage at each particular location. This may be beneficial in instances where particular resource distribution machines 140 are easier to service or access, thus allowing the entity that manages the resource distribution machine 140 to more easily reload resources in the machines, service the machines, and the like. By reducing the frequency of reloading and servicing a portion of managed resource distribution machines 140, the entity tasked with managing the resource distribution machines 140 may reduce the required expenditure and logistic complexity associated with keeping the resource distribution machines 140 operational.

FIG. 2 illustrates a process flow 200 for intelligent resource transfer analysis and resource distribution machine configuration, in accordance with various embodiments of the invention. As shown in block 202, the process flow begins by electronically receiving information associated with one or more resource transfers. In some embodiments, the one or more resource transfers is associated with one or more resource distribution machines, time periods, and users. In other embodiments, the one or more resource transfers are also associated with one or more geographical locations. In one aspect, the one or more resource transfers may be associated with one or more users and transfer types including, but not limited to, deposit, withdrawal, balance request, and/or the like. In still further embodiments, the system may receive and store resource transfer data of one or more user accounts associated with the entity that manages the resource distribution machine, or receive resource transfer data from a third party entity for which the user has authorized the sharing of such data.

As shown in block 204, the process continues by electronically receiving information associated with the one or more resource distribution machines. Information associated with resource distribution machines may include, current total amount of resources available in the resource distribution machine for physical distribution, the last time the resource distribution machine was serviced or replenished with resources, a breakdown of denominations of resources that make up the total amount of resources available for distribution at the machine, user traffic data associated with the resource distribution machine (e.g., number of resource transfers, users who have used the resource distribution machine in a given time period, and the like), location of the resource distribution machine, required expenditure to service the resource distribution machine, frequency of service available for the machine, and the like.

Next, as shown in block 206, the system may analyze resource transfer information and information associated with the one or more resource distribution machines in conjunction, comparing the resource transfer data, which may indicate patterns in user behavior, to the status and service information of the resource distribution machines in order to determine where potentially beneficial overlap may exist (e.g., users tend to require more resources at a relatively more easily serviceable resource distribution machine), determine where resource strain may exist (e.g., rate of resource withdrawal from one particular machine routinely exceeds an available amount at the resource distribution machine, demand for resources over a given time period for a particular resource distribution machine is greater than demand of more easily serviceable nearby resource distribution machine), or determine where resource surplus may exist (e.g., a given resource distribution machine rarely runs out of resources, or tends to have a large amount of a given denomination of resources available).

Based on the resource transfer data and resource distribution machine information, the system may generate a determined prediction as to the amount and denominations of additional resources that may be required or preferred to be added to one or more resource distribution machines during a given time period or on a periodic service basis, as shown in block 208. For example, in some embodiments, the system may receive data from contracting entities responsible for servicing that a particular resource machine may be serviced once per week at a particular expenditure that is within the goal budget of the entity managing the resource distribution machine, and the system may determine a required or preferred resource amount based on that periodic basis as determined by resource transfer data.

In some embodiments, the servicing of particular resource distribution machines may be preferred to the servicing of other resource distribution machines. In these instances, resource distribution machines may be labeled as either "preferred" or "non-preferred." For instance, the entity managing multiple resource distribution machines may receive data from an entity responsible for servicing the resource distribution machines that certain resource distribution machines may be more easily serviced, may be cheaper to service (e.g., the resource distribution machine is located on an existing service route which lowers the price of servicing for that particular location), may contain a greater capacity for storing resources, or may otherwise be preferred by the entity due to the nature of the particular resource distribution machine's other capabilities and characteristics (e.g., a particular resource distribution machine may be a newer generation machine and contain enhanced security, enhanced user interface, more flexible capabilities for resource denominations, deposits, and the like, a faster or more reliable network connection, and the like). In any of these scenarios, the system may determine, based on the characteristics of the resource distribution machines, servicing availability of the resource distribution machines, and resource transfer data history, one or more most favorable resource distribution machines as preferred machines for servicing based on need or preference, as shown in block 210.

Following a determination of most favorable or preferred resource distribution machines, or following a user programmed decision to select a resource distribution machine as preferred as compared to other machines, the system may transmit instructions to one or more resource distribution machines in order to alter the user interface of the one or more resource distribution machines, as shown in block 212. Alteration of the user interface may be done with one or more goals in mind, such as limiting the use of a particular resource distribution machine, suggesting more frequent use of a preferred resource distribution machine, or suggesting less frequent use of a non-preferred resource distribution machine. For example, in some embodiments, altering the user interface of a preferred resource distribution machine may include displaying a suggestion on the user interface, viewable by the user, to withdraw a bulk amount of resources previously identified as typically being withdrawn by a particular user in total over a particular timeframe, such as over multiple weekly visits, and the like. For instance, if the system identifies based on user account history and history of resource actions that the user repeats the same or similar withdrawal amounts each week at two different locations, the system may generate a suggestion to withdraw a combined weekly amount at one time at a preferred machine location.

FIG. 3 illustrates a process flow 300 for intelligent resource usage modification via resource distribution machine configuration, in accordance with various embodiments of the invention. As shown, the process begins at block 302 wherein the system determines resource transfer history for one or more users based on received resource transfer data indicating past user interactions with resource distribution machines. In some embodiments, the system may receive other data that indicates resource transfer history, such as data associated with one or more user resource accounts (e.g., spending history, withdrawal history, deposit history, and the like), which may be helpful to the system in determining intelligence resource usage modification actions. For example, if the system receives data that a user withdraws a certain daily, weekly, monthly, or other periodic amount from a branch location (e.g., from an in-person teller, and the like), the system may incorporate this data with the resource transfer data received from the resource distribution machines to generate a suggestion of higher amount of withdrawal from one specific preferred resource distribution machine. In other embodiments, the data indicating resource transfer history may indicate that a user typically withdraws resources from a machine that is not associated with the entity which manages the user's resource account, and in doing so, incurs withdrawal expenditures for using an "out of network" resource distribution machine. In these instances, a suggestion may be generated to direct the user to a machine where the user would not incur such expenditures, and thus a preferred machine may be designated as such on a per-user basis as determined by expenditure reduction for the particular user.

Next, as shown in block 304, the system may compare resource transfer history of one or more users with a planned service schedule or available, economically preferred, or other resource service schedule for one or more resource distribution machines. The system may determine where potentially beneficial overlap may exist (e.g., users tend to require more resources at a relatively more easily serviceable resource distribution machine), determine where resource strain may exist (e.g., rate of resource withdrawal from one particular machine routinely exceeds an available amount at the resource distribution machine, demand for resources over a given time period for a particular resource distribution machine is greater than demand of more easily serviceable nearby resource distribution machine), or determine where resource surplus may exist (e.g., a given resource distribution machine rarely runs out of resources, or tends to have a large amount of a given denomination of resources available).

As shown in block 306, the system may determine an alteration in service schedule is that is logistically beneficial for some reason (e.g., ease of access to a particular resource distribution machine, relatively low required expenditure of servicing one or more resource distribution machines as compared to others in the same area, technological feature capacity of certain resource distribution machines by nature of higher processing power, newer user interface, and the like). In response to this determination, as shown in block 308, the system may transmit instructions to one or more selected resource distribution machines to alter the user interface in a manner aimed at modifying user resource transfer behavior.

For instance, as shown in block 310, the system may transmit instructions to one or more resource distribution machines to limit available options for resource distribution machines that are located in unfavorable servicing locations, or otherwise not preferred for servicing. In some embodiments, this may include limiting the amount of selectable denomination options for a particular resource distribution machine that was previously capable of offering a choice of resource denomination. In other embodiments, the user interface may be modified to limit a total resource withdrawal limit that is below a previous maximum withdrawal amount.

As shown in block 312, in other embodiments the system may transmit instructions to one or more resource distribution machines to alter the user interface to offer increased capability, or suggestions that are aimed to promote certain resource transfer patterns or resource usage. For instance, the system or a user administrator may determine that based on resource transfer data, a particular user typically visits a preferred resource distribution machine (e.g., a machine that is less expensive or otherwise easier to service than other machines, or a machine that is newer and more technologically capable) on Mondays to withdraw a specific amount or range of resource amounts, and usually visits a another non-preferred resource distribution machine on Thursdays (e.g., a machine that is more expensive or otherwise more difficult to service than other machines or a machine that is older and more technologically limited) to withdraw a certain amount of resources. In this instance, the system may transmit instructions to the preferred resource distribution machine to display a suggestion to the user to withdraw the combined amount of resources that the user typically withdraws on a weekly basis. In other embodiments, the system may transmit instructions to the preferred resource distribution machine to offer a wider range of denomination options (e.g., allow the user to choose a specific combination of currency denominations that equal the full amount of the withdraw request, and the like). It is understood that other suggestions may be programmed to display on the user interface of the resource distribution machines, such as lower required expenditure to withdraw resources, and the like.

As shown in block 314, the system may receive and analyze resource transfer data after instructions have been transmitted to the resource distribution machines in order to analyze this data and determine if resource transfer data indicates a change in user behavior. In this way, the system may provide data as to whether or not the resource usage modification is taking place, and an assumption may be made based on a correlation of transmitted instructions temporally associated with a change in user pattern of resource transfer activity. Such analytics may be stored by the system and displayed to user administrators of the system, and may include recommendations for continuing or changing transmitted instructions in order to achieve more impactful results in resource transfer modification. In some embodiments, such analytics data may also be combined with known service expenditure information related to the servicing of resource distribution machines in order to create a forecasted projection of change in required service expenditure for one or more resource distribution machines. For instance, the system may identify that logistics of servicing a fleet of resource distribution machines has been reduced by a certain percentage value over time due to the nature of increased usage of preferred machines and decreased usage of non-preferred machines, and may extrapolate this data across a forecasted time period to indicate projected service expenditure savings over a future time period. In some embodiments, the projected service expenditure savings may be separated based on selectable or recommended additional instructions for altering user interface of one or more resource distribution machines (e.g., the system may project a forecasted service expenditure value if user suggestions are applied to a particular preferred machine, wherein historically the particular user suggestion has been associated with an average increased usage or shifted usage value of "X %" based on resource transfer data).

FIG. 4 illustrates a process flow 400 for intelligent resource transfer suggestions via a user device, in accordance with various embodiments of the invention. As shown in block 402, the process begins wherein the system receives data on user resource account activity. In some embodiments, the system is managed by an entity that maintains user resource accounts for one or more users, such as a financial institution, and may receive user resource account activity data from entity servers or data stores. In other embodiments, user resource account activity data may be voluntarily shared by third party entities, or users themselves from an external network. As such, it is understood that user resource account data may be received from various data channels. The system may analyze the user resource account activity data to identify data indicated user resource transfer history (e.g., spending history, withdrawal history, deposit history, transfer history, and the like), as shown in block 404. Based on user transfer history, the system may extract information relevant to the use of resource distribution machines, as evidenced by transaction identifiers, source of resources, or destination of resources, for particular transactions or resource activities, and the like. In this way the system may identify resource activities on one or more user resource accounts that involve the use of resource distribution machines.

Resource activities involving resource distribution machines identified in user resource account activity data may indicate a geolocation of known resource distribution machines managed by the entity managing the resource usage modification system, or may indicate resource distribution machines managed by a third party, or "out of network" machines. Out of network machines or third party machines may also be identified by the resource value associated with a particular resource activity in the user resource account history data. For instance, the system may recognize that the user resource account history data indicates a withdrawal total for a typical denomination (e.g., 10 dollars, 20 dollars, 50 dollars, and the like) plus some other amount known to indicate a withdrawal expenditure (e.g., total withdrawal amount may be 23.50 dollars, indicating a withdrawal of 20 dollars from the user's resource account, and an additional expenditure of 3.50 dollars for use of the third party machine). In some embodiments, expenditure values for use of third party machines may be previously stored values or values received from one or more entities as third party data. In other embodiments, expenditure values may be extrapolated and assumed by the system based on resource activity metadata indicating a withdrawal of funds from a user resource account at a resource distribution machine for a total withdrawal value that does not equate to a typical resource distribution machine dispensable denomination (e.g., 10 dollars, 20 dollars, 50 dollars, and the like).

In instances where the system has determined expenditure values based on user resource account activity data, the system may identify preferred resource distribution machines in the same or similar geographic area that the user incurred the expenditure value. For instance, the system may receive user geolocation data from one or more user devices via authorized location sharing with the system directly, or by user authorized access to user device location data that is prestored by the user device. In other instances, a geolocation may be discerned from the user resource account activity data, such as from metadata associated with a particular resource activity. In some embodiments, the system may identify that the preferred resource distribution machine could be utilized by the user that incurred the expenditure value to make a similar withdrawal without incurring the expenditure value, thus saving the user resources and reducing expenditure for the user, as shown in block 406.

Once the expenditure savings suggestion has been identified by the system, the system may transmit instruction to the user device of the user to display the expenditure savings suggestion as an alert or message on the user interface of the user device, as shown in block 408. The alert or message displayed on the user device may simply indicate that the expenditure savings suggestion has been identified for the user, and may prompt the user to open a mobile application, such as an online banking or resource managing mobile application to view more details. In other embodiments, the system may transmit the expenditure savings suggestion to the user device via a standalone alert, such as an overlaid message notification, a drop down notification, or via text message, short message service (SMS) message, multimedia message, email message, or other digital messaging channel. In some embodiments, the suggestion may include reference to one or more preferred resource distribution machines that the system has identified that the user may utilize to perform resource activities. The suggestion may include details such as location of the preferred resource distribution machine, and capabilities of the preferred resource distribution machine (e.g., user-selection of exact denominations of resources, 24/7 access, and the like).

In some embodiments, the user may be given the option to select and implement the expenditure savings suggestion via the user device. The system may receive the user selection to use one or more preferred resource distribution machines, as shown in blown 410, and may transmit additional information to the user device in order to aid the user. For instance, the system may display an address or directions to one or more preferred resource distribution machines nearby the location of the user device or the location where the user has completed resource activities in the past. In other embodiments, the system may aid the user by pre-authorizing a resource activity at a preferred resource distribution machine, as shown in block 412. The system may transmit instructions to display options on the user device for the user to select a resource amount and a resource action to be completed at the preferred resource distribution machine (e.g., the user may select to withdraw 100 dollars at the preferred resource distribution machine). In response to the user selecting an option to pre-authorize a resource activity, the system may transmit a communication to the preferred resource distribution machine, or may store tokenized resource activity pre-authorization data on the backend system storage that may be later accessed remotely by one or more resource distribution machines in order to physically complete the resource activity, as shown in block 414. To physically complete the resource activity at the resource distribution machine, the system may communicate a pre-authorization code to the user to present at the resource distribution machine that matches or otherwise coincides with the tokenized resource activity pre-authorization data, such as a QR code, and the like. In other embodiments, the user may be prompted to perform a three way authentication while present at the resource distribution machine by entering a personal identification code associated with their resource account at the resource distribution machine, and also entering a code transmitted to the user device in real-time at the time or immediately before the resource activity is physically completed (e.g., the system may transmit instructions for the user device to display a code, or may transmit a code to an authenticated user device via secure message, text message, email message, and the like).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for resource usage modification based on resource services, the system comprising:
a processor; and memory coupled to the processor, the memory storing instructions that, when executed by the processor, cause the processor to:
receive resource transfer information from one or more resource distribution machines;
receive machine-specific information from the one or more resource distribution machines;
analyze the resource transfer information and the machine-specific information in conjunction and determine predicted servicing requirements for the one or more resource distribution machines based on the analysis;
designate the one or more resource distribution machines as preferred or non-preferred resource distribution machines based on the predicted servicing requirements for the one or more resource distribution machines, wherein the preferred resource distribution machines comprise machines with a lower price of servicing relative to the non-preferred resource machines; and
transmit instructions to the non-preferred resource distribution machines to cause the non-preferred resource distribution machines to limit a display of available options via limiting an amount and denomination of resources available for resource transfer at the non-preferred resource distribution machines versus the preferred resource distribution machines, wherein the non-preferred resource distribution machines still contain resources to enable non-limited options for resource transfer, but the display of available options limits the amount and denominations of resource available for selection.

2. The system of claim 1, wherein the resource transfer information comprises data related to withdrawal of resources from the one or more resource distribution machines, and metadata comprising geographic location, time of day, denominations of resources, amount of resources, or frequency of resource transfers.

3. The system of claim 1, wherein machine-specific information comprises real-time information related to amount of resources contained in each of the one or more resource distribution machines, denominations of resources contained in each of the one or more resource distribution machines, expenditure to service each of the one or more resource distribution machines, frequency of use of each of the one or more resource distribution machines, or technological capabilities of each of the one or more resource distribution machines.

4. The system of claim 1, wherein determining predicted servicing requirements for the one or more resource distribution machines further comprises calculating a timeframe during which the one or more resource distribution machines will require additional resources based on amount of resources currently contained in the one or more resource distribution machines and frequency of resource transfers occurring at the one or more resource distribution machines.

5. The system of claim 1, wherein designating the one or more resource distribution machines as preferred or non-preferred resource distribution machines further comprises comparing a relative expenditure requirement of servicing the one or more resource distribution machines and determining that an expenditure is relatively higher or lower than other resource distribution machines within a designated geographical area.

6. The system of claim 1, further configured to transmit instructions to cause the preferred resource distribution machines to display a suggestion for a recommended resource transfer.

7. A computerized method for resource usage modification based on resource services, the method comprising:
receiving, by one or more processors, resource transfer information from one or more resource distribution machines;
receiving, by the one or more processors, machine-specific information from the one or more resource distribution machines;
analyzing, by the one or more processors, the resource transfer information and the machine-specific information in conjunction and determining, by the one or more processors, predicted servicing requirements for the one or more resource distribution machines based on the analysis;
designating, by the one or more processors, the one or more resource distribution machines as preferred or non-preferred resource distribution machines based on the predicted servicing requirements for the one or more resource distribution machines, wherein the preferred resource distribution machines comprise with a lower price of servicing relative to the non-preferred resource machines; and
transmitting, by the one or more processors, instructions to the non-preferred resource distribution machines to cause the non-preferred resource distribution machines to limit a display of available options via limiting an amount and denomination of resources available for resource transfer at the non-preferred resource distribution machines versus the preferred resource distribution machines, wherein the non-preferred resource distribution machines still contain resources to enable non-limited options for resource transfer, but the display of available options limits the amount and denominations of resource available for selection.

8. The method of claim 7, wherein the resource transfer information comprises data related to withdrawal of resources from the one or more resource distribution machines, and metadata comprising geographic location, time of day, denominations of resources, amount of resources, or frequency of resource transfers.

9. The method of claim 7, wherein machine-specific information comprises real-time information related to amount of resources contained in each of the one or more resource distribution machines, denominations of resources contained in each of the one or more resource distribution machines, required expenditure to service each of the one or more resource distribution machines, frequency of use of each of the one or more resource distribution machines, or technological capabilities of each of the one or more resource distribution machines.

10. The method of claim 7, wherein determining predicted servicing requirements for the one or more resource distribution machines further comprises calculating by the one or more processors, a timeframe during which the one or more resource distribution machines will require additional resources based on amount of resources currently contained in the one or more resource distribution machines and frequency of resource transfers occurring at the one or more resource distribution machines.

11. The method of claim 7, wherein designating the one or more resource distribution machines as preferred or non-preferred resource distribution machines further comprises comparing, by the one or more processors, a relative required expenditure of servicing the one or more resource distribution machines and determining, by the one or more processors, that a required expenditure is relatively higher or lower than other resource distribution machines within a designated geographical area.

12. The method of claim 7, further comprising transmitting, by the one or more processors, instructions to cause the preferred resource distribution machines to display a suggestion for a recommended resource transfer.

13. A non-transitory machine-readable storage medium for resource usage modification based on resource services containing instructions that, when executed by a processor, causes the processor to:
receive resource transfer information from one or more resource distribution machines;
receive machine-specific information from the one or more resource distribution machines;
analyze the resource transfer information and the machine-specific information in conjunction and determine predicted servicing requirements for the one or more resource distribution machines based on the analysis;
designate the one or more resource distribution machines as preferred or non-preferred resource distribution machines based on the predicted servicing requirements for the one or more resource distribution machines, wherein the preferred resource distribution machines comprise machines with a lower price of servicing relative to the non-preferred resource machines; and
transmit instructions to the non-preferred resource distribution machines to cause the non-preferred resource distribution machines to limit a display of available options via limiting an amount and denomination of resources available for resource transfer at the non-preferred resource distribution machines versus the preferred resource distribution machines, wherein the non-preferred resource distribution machines still contain resources to enable non-limited options for resource transfer, but the display of available options limits the amount and denominations of resource available for selection.

14. The non-transitory machine-readable storage medium of claim 13, wherein the resource transfer information comprises data related to withdrawal of resources from the one or more resource distribution machines, and metadata comprising geographic location, time of day, denominations of resources, amount of resources, or frequency of resource transfers.

15. The non-transitory machine-readable storage medium of claim 13, wherein machine-specific information comprises real-time information related to amount of resources contained in each of the one or more resource distribution machines, denominations of resources contained in each of the one or more resource distribution machines, required expenditure to service each of the one or more resource distribution machines, frequency of use of each of the one or more resource distribution machines, or technological capabilities of each of the one or more resource distribution machines.

16. The non-transitory machine-readable storage medium of claim 13, wherein determining predicted servicing requirements for the one or more resource distribution machines further comprises calculating a timeframe during which the one or more resource distribution machines will require additional resources based on amount of resources currently contained in the one or more resource distribution machines and frequency of resource transfers occurring at the one or more resource distribution machines.

\* \* \* \* \*